No. 800,312. PATENTED SEPT. 26, 1905.
G. W. MEREDITH.
CHECK CONTROLLED APPARATUS.
APPLICATION FILED OCT. 28, 1904.
2 SHEETS—SHEET 1.
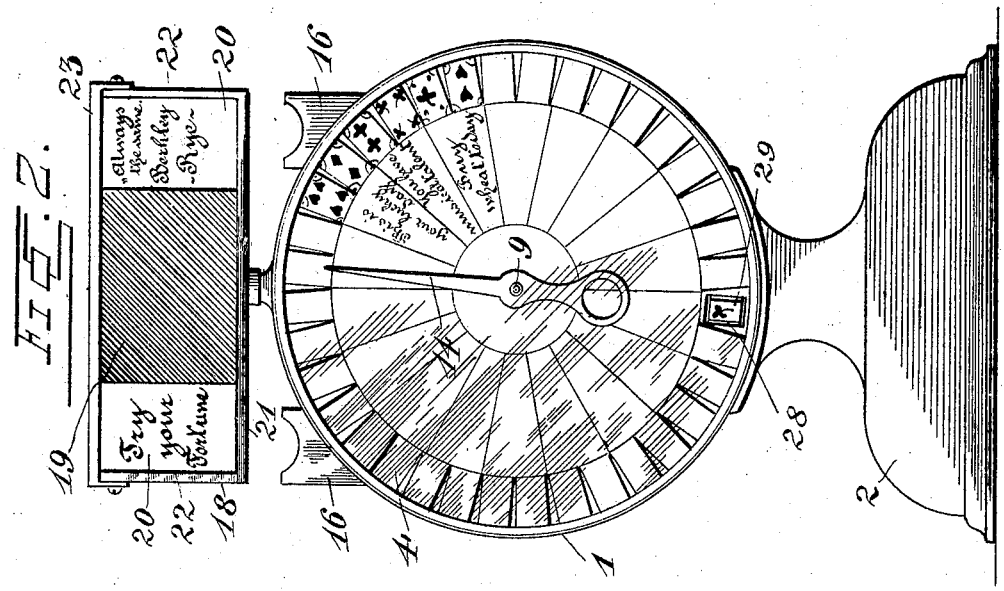
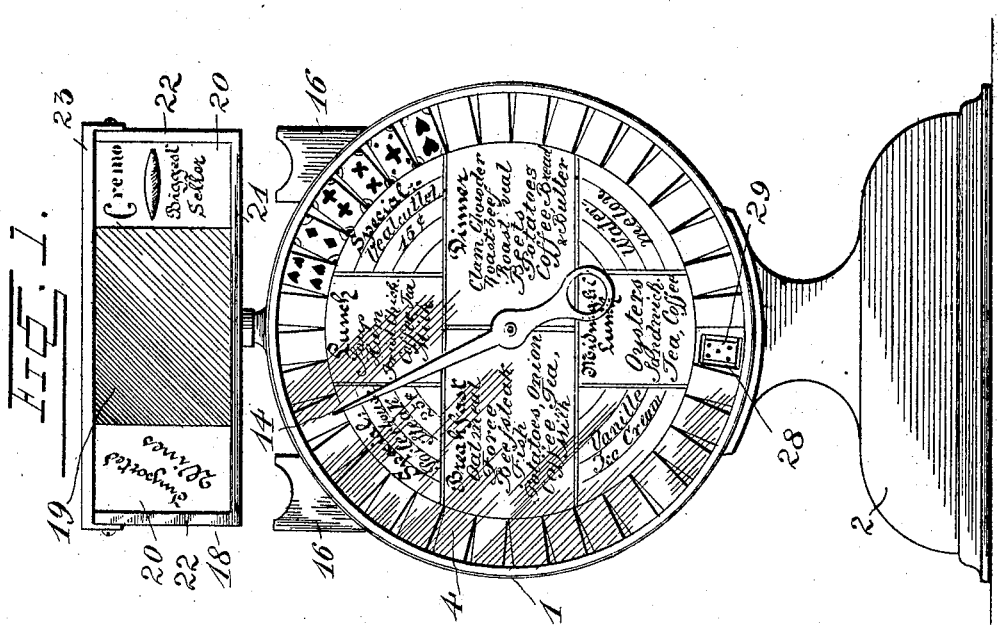
Witnesses
C. Munter
C. H. Griesbauer
Inventor
George W. Meredith
by H. R. Wilson
Attorney

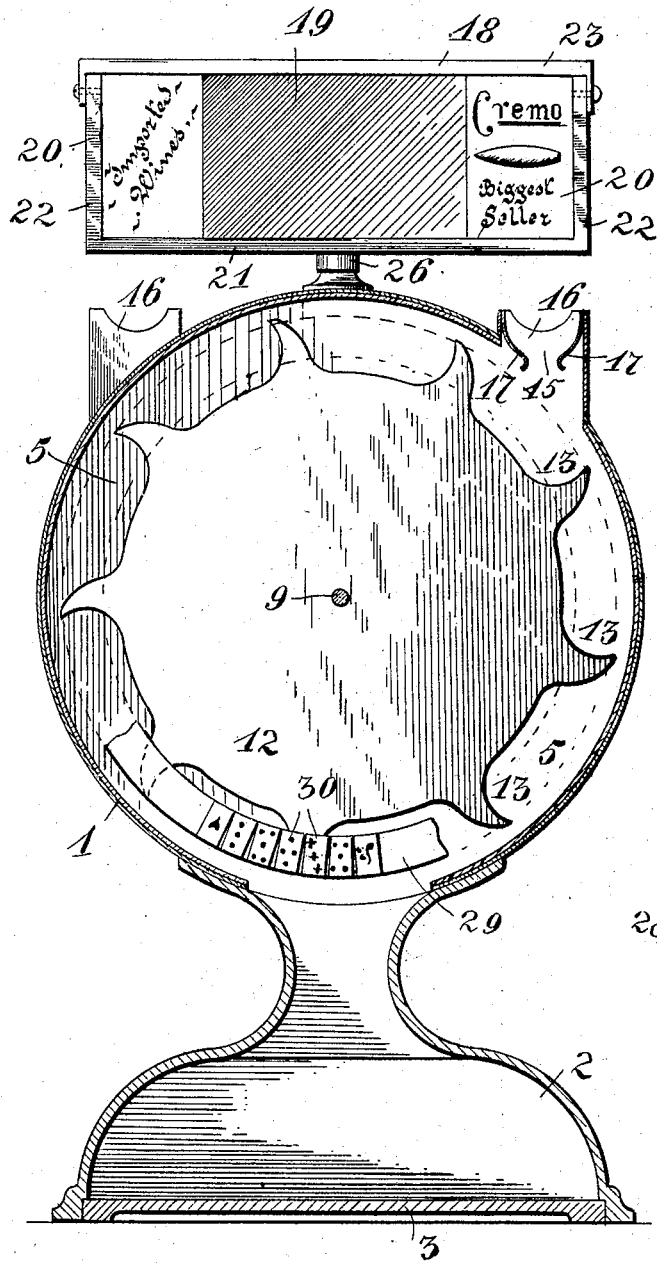
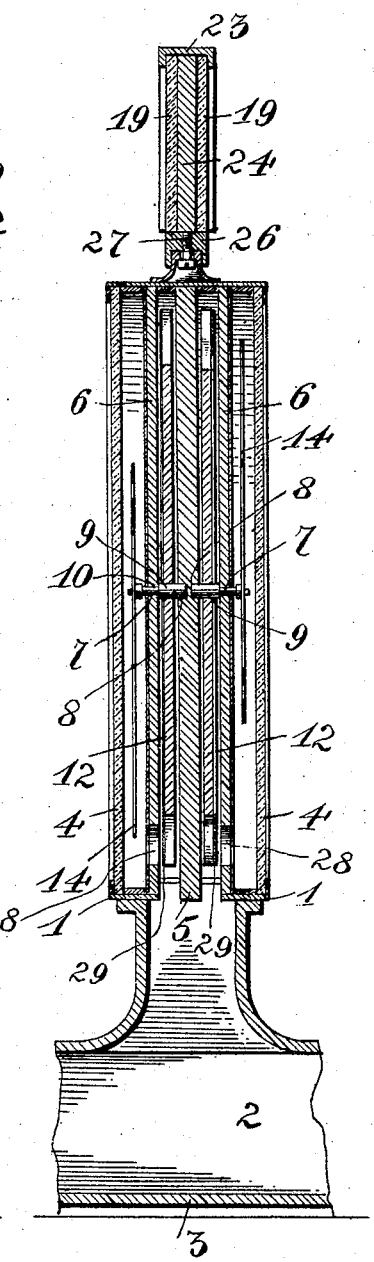

UNITED STATES PATENT OFFICE.

GEORGE W. MEREDITH, OF WICHITA, KANSAS, ASSIGNOR TO THE MENU WHEEL COMPANY, OF CINCINNATI, OHIO, A CORPORATION OF OHIO.

CHECK-CONTROLLED APPARATUS.

No. 800,312.  Specification of Letters Patent.  Patented Sept. 26, 1905.

Application filed October 28, 1904. Serial No. 230,407.

*To all whom it may concern:*

Be it known that I, GEORGE W. MEREDITH, a citizen of the United States, residing at Wichita, in the county of Sedgwick and State of Kansas, have invented certain new and useful Improvements in Check-Controlled Apparatus; and I do declare the following to be a full, clear, and exact description of the invention, such as will enable others skilled in the art to which it appertains to make and use the same.

This invention relates to improvements in check or coin controlled apparatus.

The object of this invention is to provide a machine of this character constructed and arranged as a combined advertising and amusement device which may be operated by the insertion of a check or coin.

A further object is to provide a device of this character which will be simple and inexpensive in construction and so arranged as to be operated from either side.

With these and other objects in view the invention consists in certain novel features of construction, combination, and arrangement of parts, as will be hereinafter more fully described, and particularly pointed out in the appended claims.

In the accompanying drawings, Figure 1 is a side elevation of one side of the machine. Fig. 2 is a similar view of the opposite side. Fig. 3 is a vertical transverse sectional view, and Fig. 4 is a vertical longitudinal sectional view, of the same.

Referring more particularly to the drawings, 1 denotes the body or casing of the machine, which is supported upon a hollow base 2, which may be of any suitable shape, but which is here shown as of hollow bell-shaped construction, the bottom 3 of which is movably connected to the base portion and is adapted to be locked to the same in any suitable manner.

Above the base 2 is arranged the body portion 1, which is here shown in the form of a hollow cylindrical casing open at each of its ends. In said opening to the casing is adapted to be removably secured transparent cover-plates 4. Within the casing 1 is arranged a centrally-disposed plate or partition 5, on each side of which and spaced from the same is arranged dial-plates 6, on which are adapted to be placed dial-cards containing advertising or other matter. In the plates 6 are formed similarly-disposed apertures 7, which aline with similarly-disposed recesses 8, formed in each side of the central partition or plate 5.

In the recesses 8 and apertures 7 are pivotally mounted short shafts 9, the outer ends of which where the same pass through the apertures 7 being reduced to form shoulders 10, whereby said shafts are held in place by the dial-plate 6. On each of the shafts 9, between the central partition-plate 5 and the dial-plate 6, is fixedly mounted a revolving coin-actuated disk 12. In the peripheries of said disks are formed a series of pockets 13, which are adapted to receive coins as the same are inserted into the machine.

On the outer end of the shafts 9 are secured indicating-fingers 14, which are adapted to be turned around or over the cards on the outer face of the dial-plates.

In the casing 1 on the opposite sides of the same are formed coin-receiving slots 15, which are provided with upwardly-projecting guide-chutes 16. In said guide-chutes 16 are arranged inwardly-projecting spring-fingers 17, between which the coins inserted in said chutes are forced and by which said coins are projected with more or less impetuosity into the pockets 13 of the coin-disks 12. The weight of the coins and the force given the same by the spring-fingers 14 constitute the propelling power by which the coin-disks 12 are turned. The coins are carried by the disks until the same reach the lower end of the casing, where they will be deposited into the hollow base 2. The indicating-fingers 14 being fixed on the outer ends of the shafts 9, on which said coin-disks are fixedly mounted, will be turned by the movement of said disks around or over the face of said dial-cards, stopping at different positions on the same, said stopping places or positions being determined by the distance that said coin-disks are turned by the coins inserted into the machine.

On the outer side of the casing 1 is pivotally mounted a frame 18, in which is adapted to be placed mirrors 19 and cards 20, containing advertising matter. The frames 18 may be of any suitable construction, but are here shown as formed of integral bottom and end pieces 21 and 22, and to the upper end of said end pieces is removably connected an upper cross piece or bar 23. The top, bottom, and end pieces of the frame are preferably constructed in the form of channel-iron bars, and in the same is secured a centrally-disposed partition 24, on each side of which is arranged a centrally-disposed mirror 19. Between said mirror and the ends of the frame may be arranged cards containing advertising matter or instructions for operating the machine. On the lower bar of the frame 18, midway between the ends of the same, is loosely mounted an interiorly-threaded socket 26, said socket being preferably secured to said frame by means of a screw 27, which passes loosely through an aperture formed in the bottom of the socket and is screwed into the lower bar of the frame. The socket 26 is adapted to be screwed onto a hollow exteriorly-threaded boss or projection formed or secured to the upper side of the casing 1 in line with the center of the same. By mounting the frame 18 upon the casing in this manner the same may be readily turned or revolved upon said casing.

On the dial-plates of the machine may be placed inscriptions or other matter that may be desired. On the dial-plate shown in Fig. 1 of the drawings are placed diametrically-arranged menu-cards containing menus for breakfast, lunch, dinner, and midnight lunch, and between said menu-cards are arranged concentrically-disposed spaces in which are placed lists of special dishes. On the outer edge of the dial-plate beyond said menu-cards is arranged in an annular series a full deck of miniature cards.

On the dial-plate shown in Fig. 2 of the drawings is arranged an outer annular space containing a second complete deck of miniature cards. Within said spaces is arranged a series of radially-disposed spaces, in each of which is inscribed fortune-telling phrases, which, for instance, may read as "This is your lucky day," "You have musical talent," "Buy wheat to-day," &c. These spaces may also be used, if desired, for advertising purposes.

While I have described and shown one manner in which the inscriptions on the dials may be arranged, it is obvious that any suitable matter may be placed thereon in connection with the annular series of cards arranged around the outer edges of the same. By the arrangement of these said annular series of cards on each side of the machine either side thereof may be operated independently of the other and at the same time. The turning of the coin-disks by the insertion of a coin causes the indicating-fingers to be turned around the faces of the dials, said fingers stopping at different points or opposite different cards in said annular series, thus permitting the playing of various card games.

If desired, alined openings 28 may be formed in the dial-plate 6 and the dial-cards thereon of one or both sides of the device, said holes in the dial-cards taking the place of one of the playing-cards of the annular series arranged around the outer edge of said dial cards and plates, as is clearly shown in Figs. 1 and 2 of the drawings.

On the outer faces of each of the coin-actuated disks 12, near the edge of or on that portion of the same which passes the openings 28 in the dial-plates, is arranged an annular strip 29, on which is placed a series of radially-disposed card-faces 30. Said strip 29 is preferably formed of paper and cemented to the disks 12, the card-faces being printed on said strip and representing a full deck of cards.

As the disks 12 are turned by a coin in the manner hereinbefore described the card-faces will be carried by the openings 28 until the disks stop, at which time some one of said card-faces will be opposite said opening and may be seen therethrough, thus affording additional facilities for playing various card games.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a coin-controlled device, the combination with a casing having formed therein coin-receiving slots, oppositely-disposed springs arranged in said slots whereby when a coin is forced between the same said coin will be forcibly projected into the casing, dials arranged in said casing, coin-actuated disks pivotally mounted in the same and indicating-fingers adapted to be turned by said disks over or around said dials, substantially as described.

2. In a coin-controlled device, the combination with a hollow base forming a receptacle, of a cylindrical casing arranged on said base, check-receiving slots formed in said casing, coin-actuated disks revolubly mounted in the same, said disks being provided with coin-receiving pockets formed in the periphery of the same, indicating-fingers adapted to be turned by said disks, springs arranged in the slots of said casing whereby when a coin is forced between the same said coin will be forcibly projected into one of the pockets of said disks thereby increasing the movement of the latter, substantially as described.

3. In a coin-controlled device, the combination with a hollow base forming a receptacle, of a slotted cylindrical casing arranged on said base, dials arranged in said casing, said dials having formed therein view-openings, an annular series of game-playing cards or characters arranged near the outer edges of each of said dials, coin-actuated disks revolubly mounted in said casing, an annular strip of suitable material secured to the outer face of each of said disks, said strip having arranged thereon an annular series of game cards or characters, whereby when said disks are turned said characters are brought opposite said view-openings, and indicating-fingers adapted to be turned by said disks around or over said dial-plates to point to one of the series of cards arranged thereon, substantially as described.

In testimony whereof I have hereunto set my hand in presence of two subscribing witnesses.

GEORGE W. MEREDITH.

Witnesses:
A. J. ADAMS,
U. G. CHARLES.